United States Patent [19]
Takamura et al.

[11] Patent Number: 5,390,292
[45] Date of Patent: Feb. 14, 1995

[54] APPARATUS FOR CONVERTING A GREGORY PATCH

[75] Inventors: Teiji Takamura, Matsudo; Masataka Oota, Tokyo, both of Japan

[73] Assignee: Ricoh Company, Ltd., Tokyo, Japan

[21] Appl. No.: 85,679

[22] Filed: Jun. 3, 1993

Related U.S. Application Data

[63] Continuation of Ser. No. 488,832, Mar. 6, 1990, abandoned, which is a continuation-in-part of Ser. No. 149,919, Jan. 25, 1988, abandoned.

[30] Foreign Application Priority Data

Jan. 26, 1987 [JP] Japan .................. 62-15552

[51] Int. Cl.$^6$ .............................................. G06F 15/60
[52] U.S. Cl. ................................. 395/120; 395/123; 364/474.29; 364/474.24
[58] Field of Search ............... 395/120, 123, 126, 142; 364/474.29, 474.24, 474.31, 474.23

[56] References Cited

U.S. PATENT DOCUMENTS

| | | | |
|---|---|---|---|
| 4,646,251 | 2/1987 | Hayes et al. | 395/123 |
| 4,821,214 | 4/1989 | Sederberg | 395/120 |
| 4,912,659 | 3/1990 | Liang | 395/123 X |
| 4,930,092 | 5/1990 | Reilly | 395/123 |
| 4,999,789 | 3/1991 | Fiasconaro | 395/127 |
| 5,179,644 | 1/1993 | Chiyokura et al. | 395/141 |

OTHER PUBLICATIONS

Thomas W. Sederberg et al., "Ray Tracing of Steiner Patches," ACM Computer Graphics, vol. 18, No. 3, Jul. 1984, pp. 159–164.
Turner Whitted et al., "An Improved Illumination Model for Shaded Display," Communications of the ACM, vol. 23, No. 6, Jun. 1980, pp. 343–349.
Daniel L. Toth, "On Ray Tracing Parametric Surfaces," ACM Computer Graphics, vol. 19, No. 3, Jul. 1985, pp. 171–179.
James T. Kajiya, "Ray Tracing Parametric Patches," ACM Computer Graphics, vol. 16, No. 3, Jul. 1982, pp. 245–254.
Hiroaki Chiyokura et al., "Design of Solids with Free-Form Surfaces," ACM Computer Graphics, vol. 17, No. 3, Jul. 1983, pp. 289–298.
Etienne Beeker, "Smoothing of shaped designed with free-form surfaces," Computer-aided design, vol. 18, No. 4, May 1986, pp. 224–232.
S. T. Tan et al., "Generation of high order surfaces over arbitrary polyhedral meshes," Computer-aided design, vol. 18, No. 8, Oct. 1986, pp. 411–423.

*Primary Examiner*—Raymond J. Bayerl
*Attorney, Agent, or Firm*—Popham Haik Schnobrich & Kaufman, Ltd.

[57] ABSTRACT

An apparatus for converting a three dimensional data inputted in one system to a data for another system so that the converted data is used for displaying graphical models representing a real object includes a unit for separating a three dimensional data into a Gregory patch data and a non-Gregory patch data, a unit for converting the Gregory patch data to a general patch data and a unit coupled to both the separating unit and to the converting unit for transforming the general patch data and the non-Gregory Patch data to a data used for another system. Furthermore, the converting unit is used for receiving information on control points of the Gregory patch, and for transforming the information into another information on control points and weights of the general patch data, and the general patch data is a rational Bezier patch. The converting unit is further used for transforming the information into another information on a non-uniform rational B-Spline patch.

6 Claims, 6 Drawing Sheets

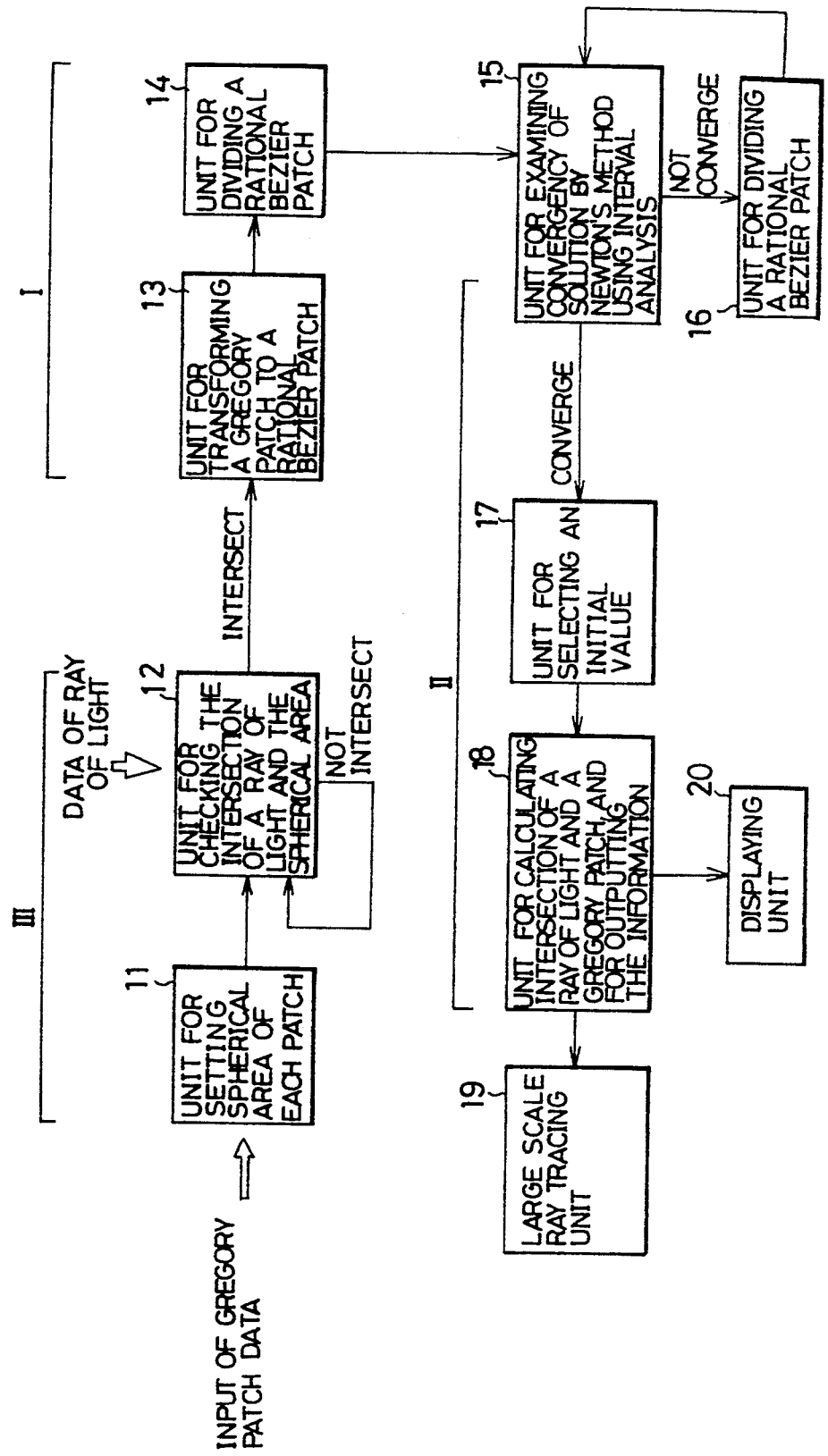

APPARATUS FOR CONVERTING A GREGORY PATCH

CROSS-REFERENCES TO RELATED APPLICATION

This application is a continuation of U.S. patent application Ser. No. 07/488,832, filed Mar. 6, 1990, now abandoned, which was a continuation-in-part of U.S. patent application Ser. No. 07/149,919, filed Jan. 25, 1988, now abandoned.

BACKGROUND OF THE INVENTION

This invention relates to an apparatus for converting a Gregory patch data in one system to a general patch data used for another system.

It is known that a Gregory patch proposed by Chiyokura and Kimura is an excellent representation which is capable of expressing a curved surface and interpolate a non-quadrilateral patch (See H. Chiyokura and F. Kimura, "Design of Solids with Free Form Surfaces", Computer Graphics (Proc. SIGGRAPH 83); Vol. 17, No. 3, July 1983, pp. 289-298). According to the Gregory patch, the complicated shape of the curved surface can be represented.

However, a method of transforming the Gregory patch data to the general patch data is not known, and a method which requires the division of a curved surface cannot apply to the Gregory patch. This is a problem in handling the Gergory patch (see E. Beeker "Smoothing of shapes designed with free-from surfaces" CAD, Vol. 18, No. 4, May 1986, pp. 224-232, or S. T. Tan and K. C. Chan "Generation of high order surfaces over arbitrary polyhedral meshes" CAD, Vol. 18, No. 8, October 1986; pp. 411-423).

The ray tracing is an algorithm to form a real image (see T. Whitted "An Improved Model for Shaded Display" Comm. ACM, Vol. 23, No. 6, June 1980, pp. 96-102) and there are developed several methods of ray tracing a free-form curved surface.

Generally, when a free-form curved surface is ray traced, the intersection of the surface and a ray of light must be calculated. To this end, there are a method which was performed by Toth using Newton's method (see D. L. Toth "On Ray Tracing Parametric Surfaces" Computer Graphics (Proc. SIGGRAPH 85), Vol. 19, No. 3, July 1985, pp. 171-179) and a method of calculating the intersection by implicitizing a free-form curved surface (see J. T. Kajiya "Ray Tracing Parametric Patches" Computer Graphics (Proc. SIGGRAPH 82), Vol. 16, No. 3, July 1982, pp. 245-254, or T. W. Sederberg and D. C. Anderson "ray Tracing of Steiner Patches" Computer Graphics (Proc. SIGGRAPH 84), Vol. 18, No. 3, July 1984, pp. 159-164. In order to calculate the intersection of the ray of light and the surface by Newton's method, the initial value toward which a solution by the Newton's method converges must be selected. To this end, Toth uses interval analysis.

The interval analysis is a method of analyzing whether a solution by the Newton's method converges when the equations for a curved surface and a ray of light are given and Newton's method is started from any point in an area in which the curved surface exists. If it is perceived that a solution by the Newton's method does not converge as a result of the interval analysis, the curved surface is divided to reduce the area in which the curved area exists and the convergence of a solution by the Newton's method according to the interval nanlysis is again examined.

When a Gregory patch is ray traced, implicitization of the Gregory patch brings about an at least 18th-degree equation to thereby increase the cost required for calculating the intersection, and any one of the previously mentioned related arts can not transform the Gregory patch data into general patch data such as rational Bezier patch data or a non-uniform rational B-Spline patch data.

SUMMARY OF THE INVENTION

It is therefore an object of present invention to provide an apparatus which converts a Gregory patch data into general patch data such as the rational Bezier patch data or the non-uniform rational B-Spline data.

The object of the invention can be achieved by an apparatus for converting a three dimensional data inputted in one system to a data for another system so that said converted data is used for displaying graphical models representing a real object, the apparatus comprising:

an unit for separating a three dimensional data into a Gregory patch data and a non-Gregory patch data;

an unit for converting said Gregory patch data to a general patch data; and an unit coupled to both said separating means and to said converting means for transforming said general patch data and said non-Gregory Patch data to a data used for another system.

Preferably, the converting unit is used for receiving information on control points of the Gregory patch, and for transforming the information into information on control points and weights of the general patch data.

Furthermore, preferably, the general patch data is a rational Bezier patch.

The converting means may be further used for transforming Gregory patch information into information on a non-uniform rational B-Spline patch.

The Gregory patch may preferably be represented by a bicubic equation described as, $$G(u,v) = \sum_{i=0}^{3} \sum_{j=0}^{3} B_{i,3}(u) B_{j,3}(v) P_{ij}(u,v) \quad (1)$$

where, $B_{i,3}(u)$, $B_{j,3}(v)$ are Bernsteins n-th degree basic function with n=3, given by, in general form, $$B_{i,n}(t) = B_i^n(t) = \binom{n}{i} t^i (1-t)^{n-i}$$

and $P_{00}, ---, P_{33}$ represents control points in said Gregory patch, given by $$P_{ij}(u,v) = P_{ij} \ (ij \neq 11,12,21,22)$$

$$P_{11}(u,v) = \frac{uP_{110} + vP_{111}}{u + v}$$

$$P_{21}(u,v) = \frac{(1-u)P_{210} + vP_{211}}{(1-u) + v}$$

$$P_{12}(u,v) = \frac{uP_{120} + (1-v)P_{121}}{u + (1-v)}$$

$$P_{22}(u,v) = \frac{(1-u)P_{220} + (1-v)P_{221}}{(1-u) + (1-v)}$$

where the three numbered suffix of P on the right-hand side represents the coordinates in three dimensions.

The Beizer patch is represented by a biseventh-degree equation described as, $$G(u,v) = \frac{\sum_{i=0}^{7} \sum_{j=0}^{7} B_{i,7}(u) B_{j,7}(v) W_{ij} Q_{ij}}{\sum_{i=0}^{7} \sum_{j=0}^{7} B_{i,7}(u) B_{j,7}(v) W_{ij}}$$

where $W_{ij}$ are weights (i=0, - - -, 7, j=0, - - -, 7) and $Q_{ij}$ are 64 control points.

The non-uniform rational B-Spline patch date is described as $$G(u,v) = \frac{\sum_{i=0}^{7} \sum_{j=0}^{7} N_{i,8}(u) N_{j,8}(v) W_{ij} Q_{ij}}{\sum_{i=0}^{7} \sum_{j=0}^{7} N_{i,8}(u) N_{j,8}(v) W_{ij}}$$

where the order is 8, the degree is 7, $Q_{ij}$ is a control point, $W_{ij}$ is a weight of each control point and $N_{i,8}$ is a B-Spline functions, with a knot vector $t=[t_0, t_1, ---, t_{15}]$, given by $$N_{j,1}(t) = \begin{cases} 1 & (t_j \leq t < t_{j+1}) \\ 0 & \text{(otherwise)} \end{cases}$$

$$N_{j,k}(t) = \frac{t - t_j}{t_{j+k-1} - t_j} N_{j,k-1}(t) + \frac{t_{j+k} - t}{t_{j+k} - t_{j+1}} N_{j+1,k-1}(t)$$

for k>1, where $Q_{ij}$ is a control point and $W_{ij}$ is a weight of each control point.

The another system is preferably Computer-Aided Design/Computer-Aided Manufacturing system for designing and manufacturing a product in accordance with said transformed information.

The another system includes a Numerical Control system for manufacuturing said product by cutting path into a material in accordance with said transformed information.

Accordingly, when the three dimensional data is inputted to the apparatus of the present invention, the Gregory patch data can be transformed to the general patch data such as the Bezier patch data and the non-uniform rational B-Spline patch data which are supported by IGES and the like. Therefore, the data representing the shape of the object can be passed to another system for processing a cubic form using a computer, and the algorithm which is applied only to the general curved surfaces formed by the rational Bezier patch and the non-uniform rational B-Spline patch and the like can be applied to the curved surfaces generated by the Gregory patch.

Further objects and advantages of the present invention will be apparent from the following description of the preferred embodiments of the invention as illustrated in the accompanying drawings.

BRIEF DESCRIPTION OF THE DRAWINGS

FIG. 3 is a flowchart showing a ray tracing apparatus which is using the converting unit of FIG. 2;

DESCRIPTION OF THE PREFERRED EMBODIMENTS

Explanation will now be made to the preferred embodiments of this invention referring to the accompanying drawings.

According to one embodiment of an apparatus of this invention, a bicubic Gregory patch transformed into a bi-7th-degree rational Bezier patch and this rational Bezier patch is divided.

First the transformation of a Gregory patch to a rational Bezier patch will now be described.

Figure 1:
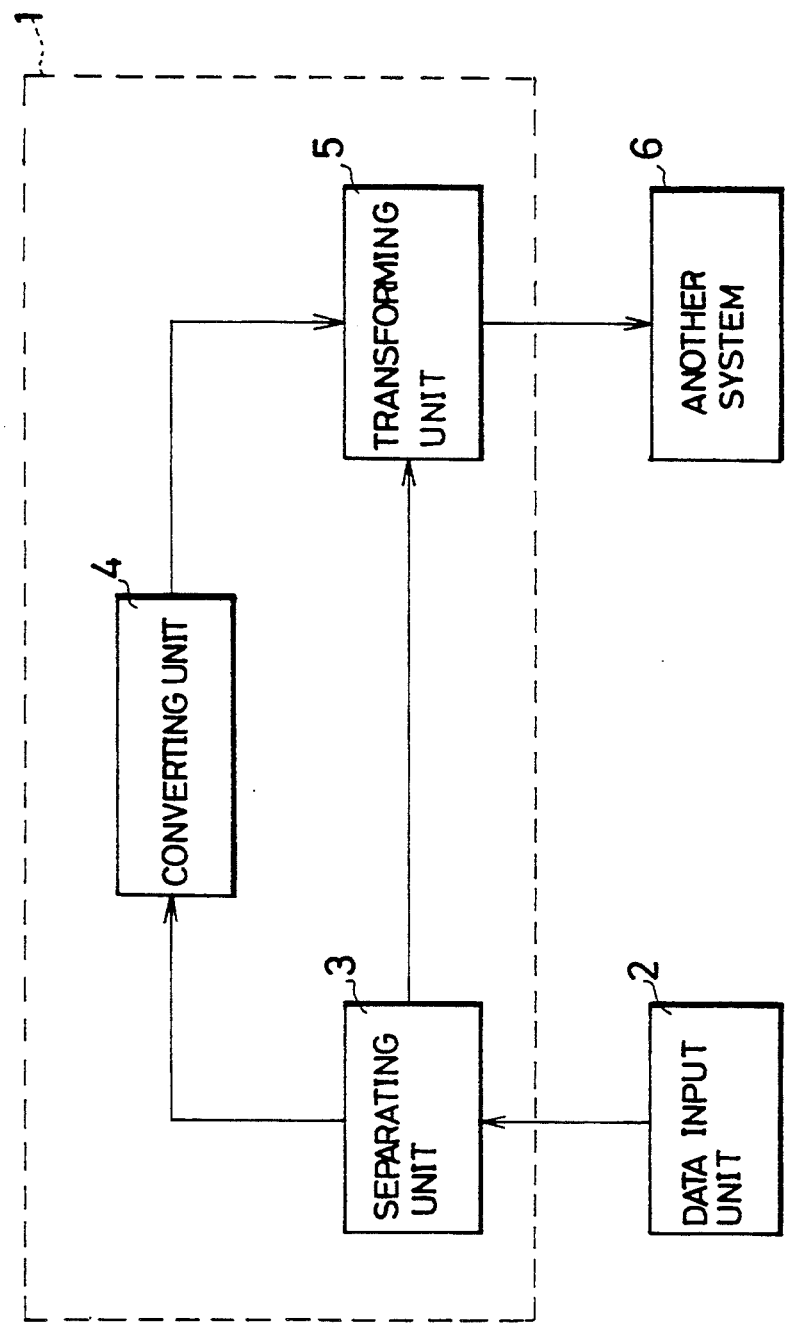
FIG. 1 is a schematic diagram showing the structuring elements of this invention.

FIG. 1 is a schematic diagram showing the main elements of one embodiment of this invention. Now more details of this embodiment will be described with referring FIG. 1 below.

The apparatus 1 receives 3-dimensional data from the data input unit 2 at the separating unit 3. The separating unit 3 then separates the received data into Gregory patch data and non-Gregory patch data. The Gregory patch data is then transmitted to the converting unit 4, whereas the non-Gregory patch data is transmitted to the transforming unit 5 without passing through the converting unit 4.

The converting unit 4 converts the Gregory patch data to a rational Bezier patch data, this conversion process will be described in details in FIG. 2 later. The rational Bezier patch data is then transmitted to the transforming unit 5.

The transforming unit 5 transforms both the rational Bezier patch data and the non-Gregory patch data into data supported by standards of cubic form such as IGES (Initial Graphic Exchange Specification) which is readily used for another system of CAD/CAM.

Figure 2:
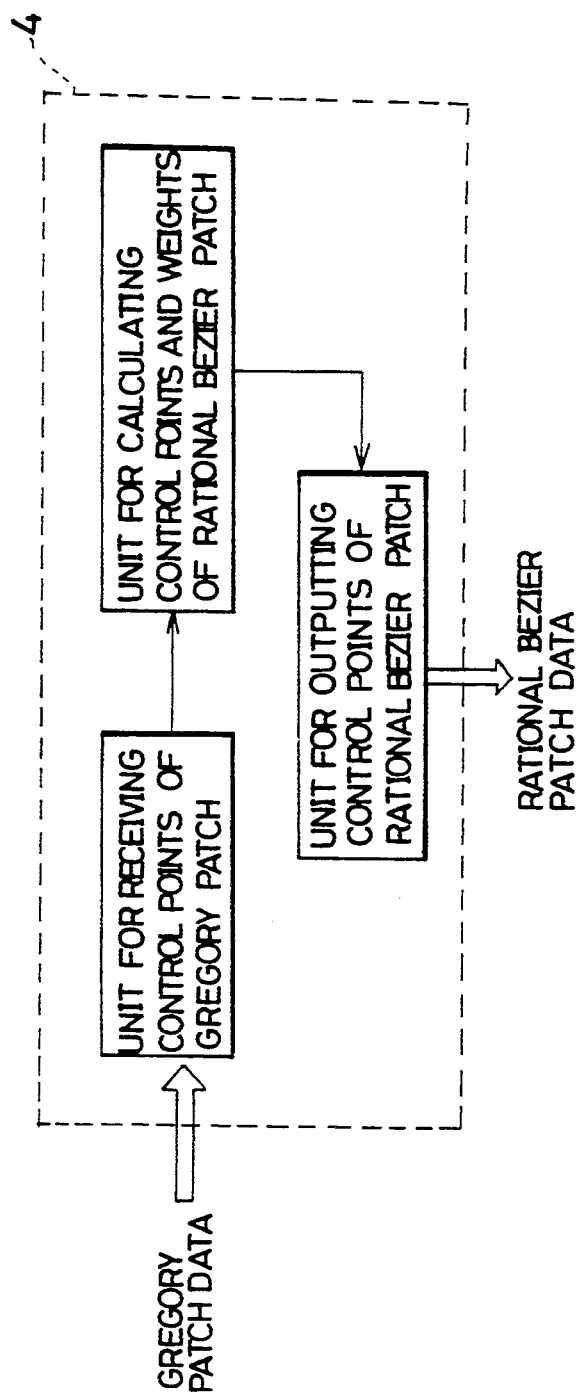
FIG. 2 is a schematical diagram illustrating the structuring elements of the converting unit in FIG. 1.

FIG. 2 shows a process of the converting unit 4 shown in FIG. 1, and FIG. 3 shows one method of ray tracing apparatus which is using the converting unit 4 shown in FIG. 2.

Now, if $B_{i,n}(x)$ is a Bernstein's n-th degree basic function given by $$B_{i,n}(x) = \binom{n}{i} x^i (1 - x)^{n-i},$$

the bicubic Gregory patch is then given by $$G(u,v) = \sum_{i=0}^{3} \sum_{j=0}^{3} B_{i,3}(u) B_{i,3}(v) P_{ij}(u,v) \qquad (1)$$

where $P_{ij}(u,v) = P_{ij}$ (ij ≠ 11,12,21,22)

-continued $$P_{11}(u,v) = \frac{uP_{110} + vP_{111}}{u + v}$$

$$P_{21}(u,v) = \frac{(1 - u)P_{210} + vP_{211}}{(1 - u) + v}$$

$$P_{12}(u,v) = \frac{uP_{120} + (1 - v)P_{121}}{u + (1 - v)}$$

$$P_{22}(u,v) = \frac{(1 - u)P_{220} + (1 - v)P_{221}}{(1 - u) + (1 - v)}$$

and where parameters u and v are in a range of $0 <= u$, $v <= 1$ and $P_{00}$, - - - , $P_{33}$ are a control point in the Gregory patch.

As is clear from equation (1), the boundary line of the Gregory patch becomes a Bezier curve. However, generally, the internal cross-section line does not become a Bezier curve. Namely, generally, what is obtained by dividing a Gregory patch does not become a Gregory patch.

Since a Gregory patch cannot be divided as it is, the Gregory patch is to be transformed into a general patch equation by using the converting unit 4. To this end, the multiplication of the denominators of equation (1) is expressed as W(u, v) as follows:

$$W(u, v) = (u+v)(1-u+v)(u+1-v)(1-u+1-v) \quad (2)$$

Of both the side members of equation (1) each are multiplied by equation (2), the term of the denominator of the right side member of equation (1) will disappear. Here, the following seting is made $$Q(u,v) \stackrel{def}{=} W(u,v)G(u,v) \quad (3)$$

Since equation (3) is a 7th-degree polynomial of u and v, it can be written as $$Q(u,v) = \sum_{i=0}^{7} \sum_{j=0}^{7} F_i(u)F_j(v)P'_{ij} \quad (4)$$

where Fi(u) is an i-th degree polynomial of u, Fj(v) is a j-th degree polynomial of v, and P'ij is a vector determined by a control point in the Gregory patch and the form of Fi(u) and Fj(v).

From equations (3) and (4), the equation (5) is given by $$G(v,u) = \sum_{i=0}^{7} \sum_{j=0}^{7} F_i(u)F_j(v)P'_{ij}/W(u,v) \quad (5)$$

The numerator of equation (5) is a 7th degree equation of u and v and the denominator of equation (5) is a quartic equation, If the denominator and numerator of equation (5) is rearranged to a 7th degree homogeneous equation of u, $(1-u)$, v, and $(1-v)$ using the following equation, $$1 = u + (1-u) = v + (1-v) \quad (6)$$

and if the control point are multipied by the corresponding appropriate coefficients, equation (5) can be modified so as to have Bernstein's 7th-degree basic functions Bi,7(u) and Bj,7(v). By this modification, the following equation (7) is given by $$G(u,v) = \frac{\sum_{i=0}^{7} \sum_{j=0}^{7} B_{i,7}(u)B_{j,7}(v)W_{ij}Q_{ij}}{\sum_{i=0}^{7} \sum_{j=0}^{7} B_{i,7}(u)B_{j,7}(v)W_{ij}} \quad (7)$$

This equation (7) represents bi-7th degree rational Bezier patch, where Wij are weigths acting on each of respective control points and Qij are control points in the patch.

By inputting control points of the Gregory patch data to the data converting unit 4, sixty four control points $Q_{ij}$ and the weights $W_{ij}$ (i=0, . . . , 7; j=0, . . . , 7) of the bi-7th degree rational Bezier patch data are given by the above equation (7).

In the case of the non-uniform rational B-Spline patch data, the converting unit 4 converts the Gregory patch data to the output given by the following equation $$G(u,v) = \frac{\sum_{i=0}^{7} \sum_{j=0}^{7} N_{i,8}(u) N_{j,8}(v) W_{ij} Q_{ij}}{\sum_{i=0}^{7} \sum_{j=0}^{7} N_{i,8}(u) N_{j,8}(v) W_{ij}}$$

where the order is 8 and the degree is 7.

Now, if $N_{i,8}$ is a B-Spline function and a knot vector is $t = [t_0, t_1, \ldots, t_{15}]$, then it is defined as $$N_{j,1}(t) = \begin{cases} 1 & (t_j \leq t < t_{j+1}) \\ 0 & \text{(otherwise)} \end{cases}$$

$$N_{j,k}(t) = \frac{t - t_j}{t_{j+k-1} - t_j} N_{j,k-1}(t) + \frac{t_{j+k} - t}{t_{j+k} - t_{j+1}} N_{j+1,k-1}(t)$$

for $k > 1$.

Also, the $Q_{ij}$ are control points and the $W_{ij}$ are weights of each of control points, and the knot vector t returns $[0,0,0,0,0,0,0,0,1,1,1,1,1,1,1,1]$.

In fact, it is known that $Q_{ij}$ and the $W_{ij}$ are equal to those of the rational Bezier patch data.

Accordingly, it is sufficient that the converting unit 4 can transform $P_{00}, \ldots, P_{33}$ of the control points of the Gregory patch data into $Q_{ij}$ and $W_{ij}$.

This can be realized by the fact that the converting unit 4 is capable of incorporating the following algorithm;

$Q_{00} = P_{00}$,
$Q_{01} = P_{00}$,
$Q_{02} = (5P_{00} + 6P_{01})/11$,
$Q_{03} = (2P_{00} + 15P_{01} + 6P_{02})/29$,
$Q_{04} = (6P_{01} + 15P_{02} + 2P_{03})/23$,
$Q_{05} = (6P_{02} + 5P_{03})/11$,
$Q_{06} = P_{03}$,
$Q_{07} = P_{03}$,
$Q_{10} = P_{00}$,
$Q_{11} = (2(7P_{00} + 3P_{01} + 3P_{10}))/26$,
$Q_{12} = (18P_{111} + 28P_{00} + 42P_{01} + 6P_{02} + 15P_{10})/109$,
$Q_{13} = (45P_{111} + 18P_{121} + 14P_{00} + 84P_{01} + 42P_{02} + 2P_{03} + 6P_{10})/211$,
$Q_{14} = (18P_{111} + 45P_{121} + 2P_{00} + 42P_{01} + 84P_{02} + 14P_{13} + 6P_{13})/211$,
$Q_{15} = (18P_{121} + 6P_{01} + 42P_{02} + 28P_{03} + 15P_{13})/109$,
$Q_{16} = (2(3P_{02} + 7P_{03} + 3P_{13}))/26$,
$Q_{17} = P_{03}$,
$Q_{20} = (5P_{00} + 6P_{10})/11$,

-continued $Q_{21} = (18P_{110}+28P_{00}+42P_{10}+6P_{20})/109$,
$Q_{22} = (63P_{110}+63P_{111}+18P_{210}+52P_{00}+64P_{01}+15P_{02}+84P_{10}+15P_{20})/412$,
$Q_{23} = (63P_{110}+189P_{111}+18P_{120}+108P_{121}+27P_{210}+18P_{211}+9P_{220}+9P_{221}+28P_{00}+156P_{01}+84P_{02}+5P_{03}+42P_{10}+6P_{13}+6P_{20})/703$,
$Q_{24} = (18P_{110}+108P_{111}+63P_{120}+189P_{121}+9P_{210}+9P_{211}+27P_{220}+18P_{221}+5P_{00}+84P_{01}+156P_{02}+28P_{03}+6P_{10}+42P_{02}+6P_{23})/703$,
$Q_{25} = (18P_{111}+63P_{120}+63P_{121}+18P_{220}+15P_{01}+84P_{02}+52P_{03}+84P_{13}+15P_{23})/412$,
$Q_{26} = (18P_{120}+15P_{02}+28P_{03}+6P_{23})/109$,
$Q_{27} = (5P_{03}+6P_{13})/11$,
$Q_{30} = (2P_{00}+15P_{10}+6P_{20})/23$,
$Q_{31} = (45P_{110}+18P_{210}+14P_{00}+6P_{01}+84P_{10}+42P_{20}+2P_{30})/211$,
$Q_{32} = (189P_{110}+63P_{111}+18P_{120}+27P_{121}+108P_{210}+18P_{211}+9P_{220}+9P_{221}+28P_{00}+42P_{01}+6P_{02}+156P_{10}+84P_{20}+5P_{30}+6P_{31})/703$,
$Q_{33} = (234P_{110}+234P_{111}+108P_{120}+144P_{121}+144P_{210}+108P_{211}+63P_{220}+63P_{221}+14P_{00}+84P_{01}+42P_{02}+2P_{03}+84P_{10}+15P_{13}+42P_{20}+6P_{23}+2P_{30}+15P_{31}+6P_{32})/1064$,
$Q_{34} = (108P_{110}+144P_{111}+234P_{120}+234P_{121}+63P_{210}+63P_{211}+144P_{220}+108P_{221}+2P_{00}+42P_{01}+84P_{02}+14P_{03}+15P_{10}+84P_{13}+6P_{20}+42P_{23}+6P_{31}+15P_{32}+2P_{33})/1064$,
$Q_{35} = (18P_{110}+27P_{111}+189P_{120}+63P_{121}+9P_{210}+9P_{211}+108P_{220}+18P_{221}+6P_{01}+42P_{02}+28P_{03}+156P_{13}+84P_{23}+6P_{32}+5P_{33})/703$,
$Q_{36} = (45P_{120}+18P_{220}+6P_{02}+14P_{03}+84P_{13}+42P_{23}+2P_{33})/256$,
$Q_{37} = (2P_{03}+15P_{13}+6P_{23})/29$,
$Q_{40} = (6P_{10}+15P_{20}+2P_{30})/23$,
$Q_{41} = (18P_{110}+45P_{210}+2P_{00}+42P_{10}+84P_{20}+14P_{30}+6P_{31})/256$,
$Q_{42} = (108P_{110}+18P_{111}+9P_{120}+9P_{121}+189P_{210}+63P_{211}+18P_{220}+27P_{221}+5P_{00}+6P_{01}+84P_{10}+156P_{20}+28P_{30}+42P_{31}+6P_{32})/703$,
$Q_{43} = (144P_{110}+108P_{111}+63P_{120}+63P_{121}+234P_{210}+234P_{211}+108P_{220}+144P_{221}+2P_{00}+15P_{01}+6P_{02}+42P_{10}+6P_{13}+84P_{20}+15P_{23}+14P_{30}+84P_{3}+42P_{32}+2P_{33})/1064$,
$Q_{44} = (63P_{110}+63P_{111}+144P_{120}+108P_{121}+108P_{210}+144P_{211}+234P_{220}+234P_{221}+6P_{01}+15P_{02}+2P_{03}+6P_{10}+42P_{13}+15P_{20}+84P_{23}+2P_{30}+42P_{32}+14P_{33})/1064$,
$Q_{45} = (9P_{110}+9P_{111}+108P_{120}+18P_{121}+18P_{210}+27P_{211}+189P_{220}+63P_{221}+6P_{02}+5P_{03}+84P_{13}+156P_{23}+6P_{31}+42P_{32}+28P_{33})/703$,
$Q_{46} = (18P_{120}+45P_{220}+2P_{03}+42P_{13}+84P_{23}+6P_{32}+14P_{33})/256$,
$Q_{47} = (6P_{19}+15P_{28}+2P_{33})/23$,
$Q_{50} = (6P_{20}+5P_{30})/11$,
$Q_{51} = (18P_{210}+6P_{10}+42P_{20}+28P_{30}+15P_{31})/109$,
$Q_{52} = (18P_{110}+63P_{210}+63P_{211}+18P_{221}+15P_{10}+84P_{20}+52P_{30}+84P_{31}+15P_{32})/412$,
$Q_{53} = (27P_{110}+18P_{111}+9P_{120}+9P_{121}+63P_{210}+189P_{211}+18P_{220}+108P_{221}+6P_{10}+42P_{20}+6P_{23}+26P_{30}+156P_{31}+84P_{32}+5P_{33})/703$,
$Q_{54} = (9P_{110}+9P_{111}+27P_{120}+18P_{121}+18P_{210}+108P_{211}+63P_{220}+189P_{221}+6P_{13}+6P_{20}+42P_{23}+5P_{30}+84P_{31}+156P_{32}+28P_{33})/703$,
$Q_{55} = (18P_{120}+18P_{121}+63P_{220}+63P_{221}+15P_{13}+84P_{23}+15P_{31}+84P_{32}+52P_{33})/412$,
$Q_{56} = (18P_{220}+6P_{13}+42P_{23}+15P_{32}+28P_{33})/109$,
$Q_{57} = (6P_{33}+5P_{33})/111$
$Q_{60} = P_{30}$,
$Q_{61} = (2(3P_{20}+7P_{30}+3P_{31}))/26$,
$Q_{62} = (18P_{211}+15P_{20}+28P_{30}+42P_{31}+6P_{32})/109$,
$Q_{63} = (45P_{211}+18P_{221}+6P_{20}+14P_{30}+84P_{31}+42P_{32}+2P_{33})/256$,
$Q_{64} = (18P_{211}+45P_{221}+6P_{23}+2P_{30}+42P_{31}+84P_{32}+14P_{33})/256$,
$Q_{65} = (18P_{221}+15P_{23}+6P_{31}+42P_{42}+28P_{33})/147$,
$Q_{66} = (2(3P_{23}+3P_{32}+7P_{33}))/26$,
$Q_{67} = P_{31}$,
$Q_{70} = P_{30}$,
$Q_{71} = P_{30}$,
$Q_{72} = (5P_{30}+6P_{31})/11$,
$Q_{73} = (2P_{30}+15P_{31}+6P_{32})/23$,
$Q_{74} = (6P_{31}+15P_{32}+2P_{33})/23$,
$Q_{75} = (6P_{32}+5P_{33})/11$,
$Q_{76} = P_{33}$,
$Q_{77} = P_{33}$, -continued $W_{00}=W_{70}=W_{07}=W_{77}=0$,
$W_{01}=W_{71}=W_{06}=W_{76}=W_{10}=W_{60}=W_{17}=W_{67}=2/7$,
$W_{02}=W_{72}=W_{05}=W_{75}=W_{20}=W_{50}=W_{27}=W_{57}=11/21$
$W_{08}=W_{73}=W_{04}=W_{74}=W_{30}=W_{40}=W_{37}=W_{47}=23/25$,
$W_{11}=W_{01}=W_{16}=W_{66}=26/49$,
$W_{12}=W_{62}=W_{15}=W_{65}=W_{21}=W_{51}=W_{26}=W_{56}=109/147$,
$W_{13}=W_{63}=W_{14}=W_{64}=W_{31}=W_{41}=W_{36}=W_{46}=211/245$,
$W_{22}=W_{52}=W_{25}=W_{55}=412/441$,
$W_{23}=W_{53}=W_{24}=W_{54}=W_{32}=W_{42}=W_{35}=W_{45}=256/245$, and
$W_{33}=W_{43}=W_{34}=W_{44}=282/245$.

By the above procedures, the cubic Gregory patch is transformed to a 7th-degree rational Bezier patch. This rational Bezier patch has a convex closure and can be divided.

Division of the bi-7th degree rational Bezier patch expressed by equation (7) will bring about division of the Gregory patch expressed by equation (1), If equation (7) is divided into patches G' in which the parameters u and v have values in a range of $0<=u<=b$ and $0<=v<=d$, the weight W'ij and control point Q'ij of G' are given by $$W'_{ij} = \sum_{m=0}^{i} \sum_{n=0}^{j} B_{m,i}(b)B_{n,j}(d)W_{mn} \quad (8)$$

$$Q'_{ij} = \sum_{m=0}^{i} \sum_{n=0}^{j} B_{m,i}(b)B_{n,j}(d)W_{mn}Q_{mn} \quad (9)$$

in accordance with Schwartz's method.

If equation (7) is divided into patches G" in which parameters u and v have values in a range of $a<=u<=1$ and $C<=v<=1$, the weight W"ij and control point Q"ij of G" are given by $$W''_{ij} = W'_{7-i,\,7-j} \quad (10)$$

$$Q''_{ij} = Q'_{7-i,\,7-j} \quad (11)$$

Thus, the weight W*ij and control point of patch G* in which the parameters u and v have value in a range of $a<=u<=b$ and $c<=V<=d$ are given by $$W^*_{ij} = \sum_{m=0}^{i} \sum_{n=0}^{j} B_{m,i}\left(\frac{b-a}{b}\right) B_{n,j}\left(\frac{d-c}{d}\right) W_{7-i,7-j} \quad (12)$$

$$Q^*_{ij} = \quad (13)$$

$$\sum_{m=0}^{i} \sum_{n=0}^{j} B_{m,i}\left(\frac{b-a}{b}\right) B_{n,j}\left(\frac{d-c}{d}\right) W_{7-i,7-j} Q_{7-i,7-j}$$

Thus subpatches can be obtained in any parameter space.

The ray tracing of a Gregory patch now will be described in details.

In the FIG. 3, reference numeral 11 denotes a unit for setting a spherical area of each patch; reference numeral 12 denotes a unit for checking the intersection of a ray of light and the spherical area; reference numeral 13 denotes an unit for transforming a Gregory patch to a rational Bezier patch i.e. it represents the converting unit 4 in FIG. 1; reference numeral 14 denotes an unit for dividing a rational Bezier patch (unit 14 may not be provided); reference numeral 15 denotes a unit for examining the convergency of a solution by Newton's method using interval analysis; reference numeral 16 denotes an unit for dividing a rational Bezier patch; reference numeral 17 denotes a unit for selecting an initial value; reference numeral 18 denotes a unit for calculating the intersection of a ray of light and a Gregory patch and outputting the information of the intersection to a large-scale ray tracing unit 19 for processing purposes and further to a displaying unit 20.

Figure 5:
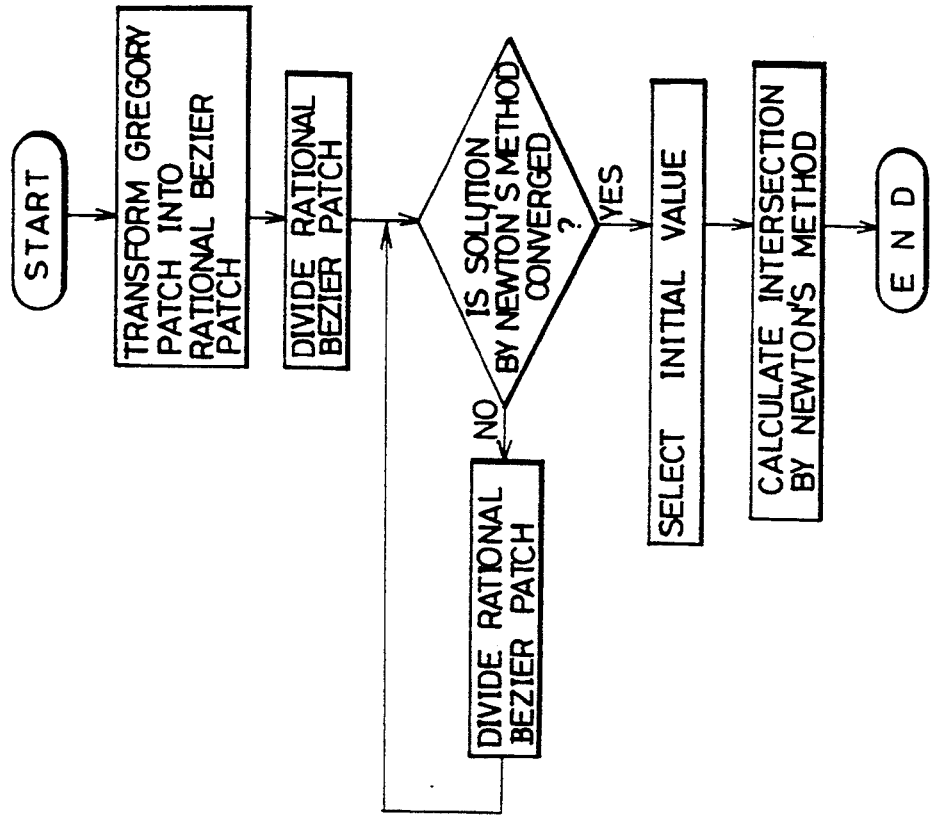
FIG. 5 is a flowchart showing the one method used in the ray tracing apparatus in FIG. 3 for the ray tracing of Gregory patch.
Figure 4:
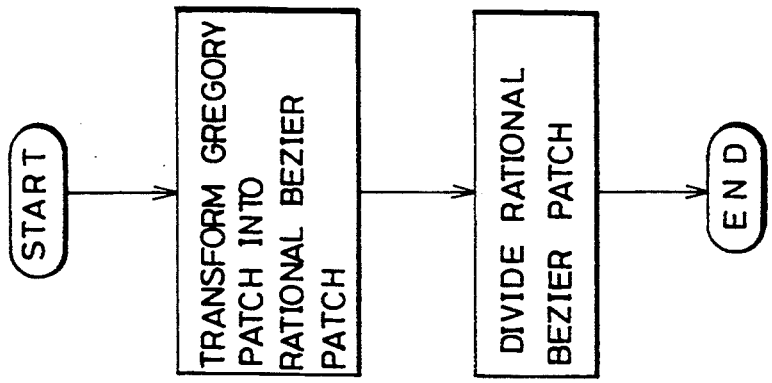
FIG. 4 is a flowchart showing main feature of the ray tracing apparatus in FIG. 3.
Figure 6:
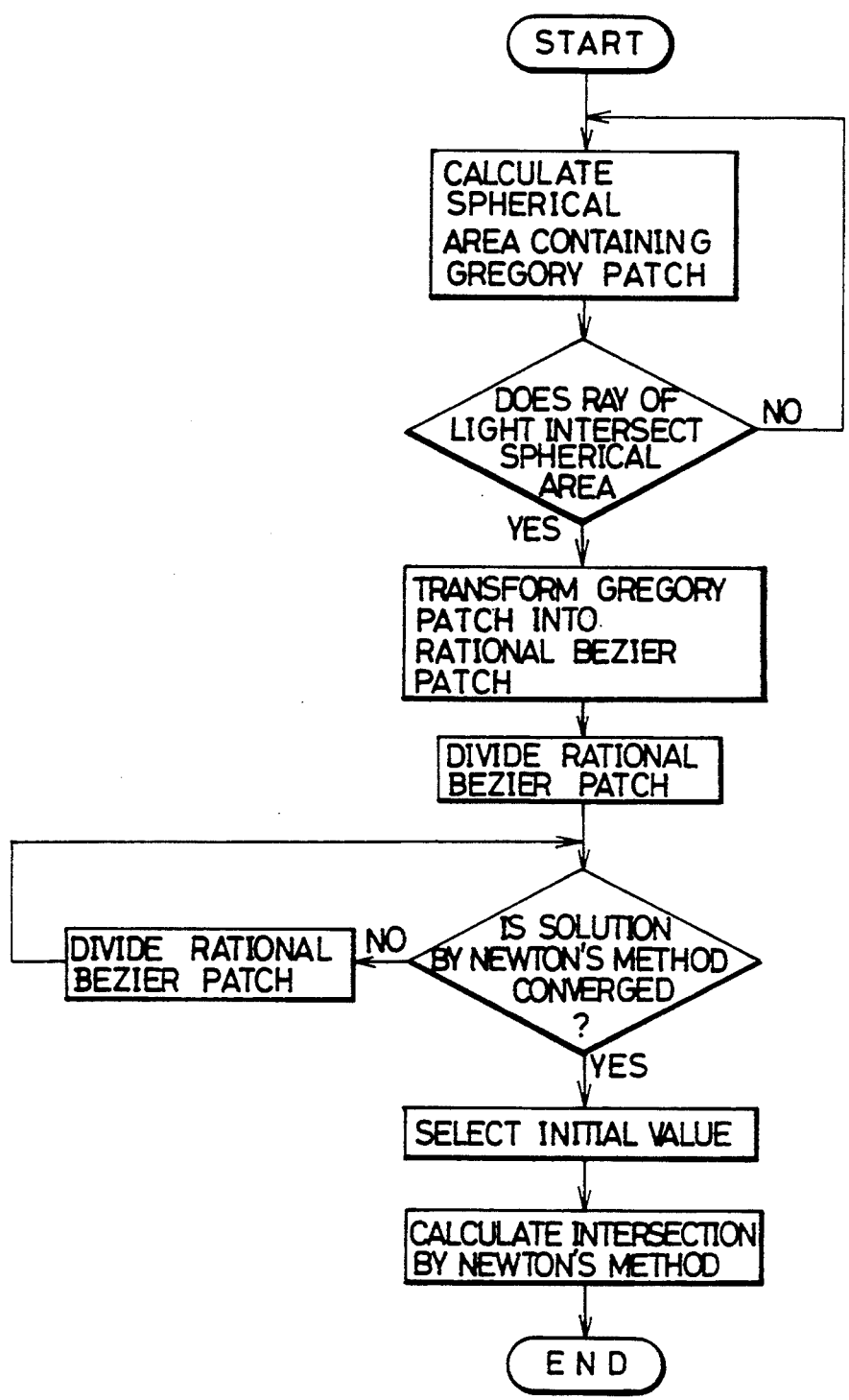
FIG. 6 is a flowchart showing the another method used in the ray tracing in FIG. 3 for the conversion of the ray tracing.

I, II and III portions in FIG. 3 are illustrated in detail in FIGS. 4, 5 and 6, respectively, and further description about the portions I, II and III will be omitted.

FIG. 4 is a flowchart showing one embodiment of division. In this embodiment, as bicubic Gregory patch is transformed into a bi-7th degree rational Bezier patch by using the converting unit 4 in FIG. 1, and the Bezier patch is then divided as described above.

FIG. 5 is a flowchart explaining one embodiment of a method of ray tracing according to this invention. According to this embodiment, it is whether a solution by Newton's method converges in a rational Bezier patch which is divided as above, using interval analysis. Alternatively, it may be examined whether a solution by Newton's method converges in a rational Bezier patch which is transformed as above without dividing, using interval analysis. The above mentioned solution by Newton's method is calculated by solving a simultaneous equations represented by a first equation of the rational Bezier patch and a second equation of a ray of light. When a solution by Newton's method does not converge, the rational Bezier patch is further divided to reduce the area in which the curved surface exists and interval analysis is repeated again when a solution by Newton's method converges, the initial is selected and the intersection is calculated using Newton's method.

FIG. 6 is a flowchart explaining another embodiment of a method of ray tracing according to this invention. This embodiment is intended to solve the problems in the embodiment of FIG. 5 which are; for example, (1) the transformation of a Gregory patch to a rational Bezier patch requires an overhead, (2) division requires a large overhead and (3) many memories are required for storing the divided rational Bezier patches. In this embodiment, a spherical area containing a Gregory patch is calculated in advance and the ray tracing shown in FIG. 5 is performed only when a ray of light intersects this spherical area.

Figure 7:
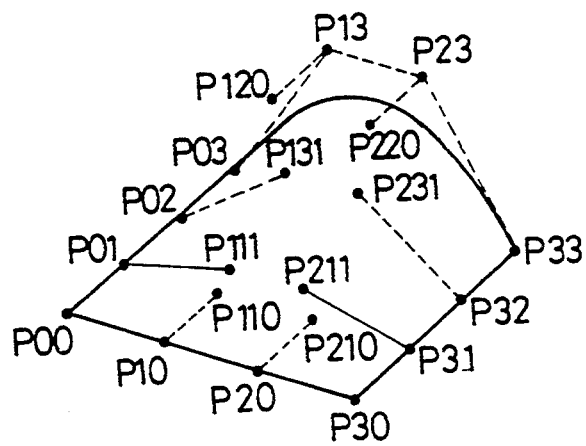
FIG. 7 illustrates one example of a Gregory patch.
Figure 8:
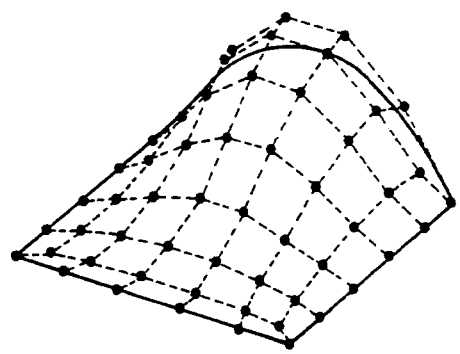
FIG. 8 illustrates one example in which a Gregory patch is transformed into a rational Bezier patch.

FIG. 7 shows the control points in the cubic Gregory patch obtained by the above transformation, and FIG. 8 shows the control points in the 7th-degree rational Bezier patch obtained by transmation of the cubic Gregory patch control points.

Figure 9:
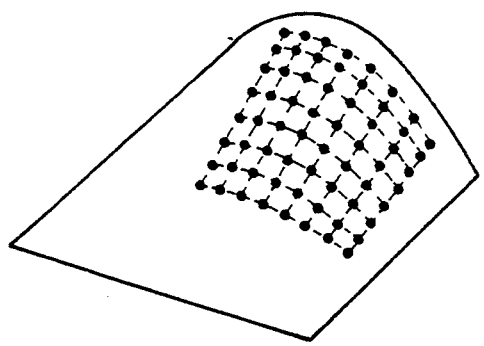
FIG. 9 illustrates one example of a divided rational Bezier patch.

FIG. 9 illustrates one example of a divided rational Bezier patch obtained in the above manner by dividing the Gregory patch by u=[0.4, 0.9] and v=[0.4, 0.9].

Many widely different embodiments of the present invention may be constructed without departing from the spirit and scope of the present invention. It should be understood that the present invention is not limited to the specific embodiments described in the specification, except as defined in the appended claims.

What is claimed is:

1. A computer-aided design/computer-aided manufacturing (CAD/CAM) system for designing and manufacturing a product in accordance with three dimensional data representing a shape of the product, in which the three dimensional data are defined by a Gregory patch, the system comprising;

a) signal outputting means for outputting a first signal representing data of control points defining the Gregory patch;

b) calculating means, connected to the signal outputting means, including:
1) means for calculating control points of a general patch and weights of each of the control points of the general patch on the basis of the first signal from the signal outputting means; and
2) means for outputting a second signal representing the calculated control points of the general patch and a third signal representing the calculated weights of the general patch;

c) data transforming means, connected to the calculating means, including:
1) means for receiving the second signal and the third signal;
2) means for transforming the control points and weights respectively represented by the received second and third signals into data supported by standards of cubic form; and
3) means for outputting a fourth signal representing the data supported by standards of cubic form; and d) a computer, connected to the data transforming means, including:
1) means for receiving the fourth signal;
2) means for processing the data supported by standards of cubic form on the basis of the received fourth signal; and
3) means for generating information for designing and manufacturing the product.

2. The CAD/CAM system of claim 1, wherein the general patch is a rational Bezier patch.

3. The CAD/CAM system of claim 2, wherein: the Bezier patch is represented by a bi-7th degree equation described as:

$$G(u,v) = \frac{\sum_{i=0}^{7} \sum_{j=0}^{7} B_{i,7}(u) B_{j,7}(v) W_{ij} Q_{ij}}{\sum_{i=0}^{7} \sum_{j=0}^{7} B_{i,7}(u) B_{j,7}(v) W_{ij}}$$

$W_{ij}$ are weights;
i and j are integers from 0 through 7, inclusive; and
$Q_{ij}$ is a control point of 64 control points $Q_{00}$ through $Q_{77}$.

4. The CAD/CAM system of claim 1, wherein the calculating means constitutes means for converting the Gregory patch into a non-uniform rational B-Spline patch.

5. The CAD/CAM system of claim 4, wherein: the non-uniform rational B-Spline patch is described as:

$$G(u,v) = \frac{\sum_{i=0}^{7} \sum_{j=0}^{7} N_{i,8}(u) N_{j,8}(v) W_{ij} Q_{ij}}{\sum_{i=0}^{7} \sum_{j=0}^{7} N_{i,8}(u) N_{j,8}(v) W_{ij}}$$

the order of the B-Spline patch is 8;
the degree of the B-Spline patch is 7;
$Q_{ij}$ is a control point of 64 control points $Q_{00}$ through $Q_{77}$;
$W_{ij}$ is a weight of each control point;
$N_{i,8}(u)$ and $N_{j,8}(v)$ are respective B-Spline functions with a knot vector $t=\{t_0, t_1, \ldots t_{15}\}$; and
$N_{i,8}(u)$ and $N_{j,8}(v)$ are each given by:

$$N_{j,1}(t) = \begin{cases} 1 & \text{if } t_j \leq t < t_{j+1} \\ 0 & \text{otherwise} \end{cases}$$

$$N_{j,k}(t) = \frac{t - t_j}{t_{j+k-1} - t_j} N_{j,k-1}(t) + \frac{t_{j+k} - t}{t_{j+k} - t_{j+1}} N_{j+1,k-1}(t)$$

$k > 1$.

6. The CAD/CAM system of claim 1, wherein:
the Gregory patch is represented by a bicubic equation described as:

$$G(u,v) = \sum_{i=0}^{3} \sum_{j=0}^{3} B_{i,3}(u) B_{j,3}(v) P_{ij}(u,v)$$

$B_{i,3}(u)$ and $B_{j,3}(v)$ are Bernstein's n-th degree basic function with n=3, given by a general form:

$$B_{i,n}(t) = B_i^n(t) = \binom{n}{i} t^i (1-t)^{n-i}$$

$P_{00}, \ldots, P_{33}$ represent control points in the Gregory patch, given by:

$$P_{ij}(u,v) = P_{ij} \ (ij \neq 11, 12, 21, 22)$$

$$P_{11}(u,v) = \frac{u P_{110} + v P_{111}}{u + v}$$

$$P_{21}(u,v) = \frac{(1-u) P_{210} + v P_{211}}{(1-u) + v}$$

$$P_{12}(u,v) = \frac{u P_{120} + (1-v) P_{121}}{u + (1-v)}$$

$$P_{22}(u,v) = \frac{(1-u) P_{220} + (1-v) P_{221}}{(1-u) + (1-v)}$$

and the three-numbered suffix of P on the right hand side represents the coordinates in three dimensions.

* * * * *